United States Patent [19]

Böhm et al.

[11] 4,263,596
[45] Apr. 21, 1981

[54] REFERENCE STATION FOR A DISTANCE-MEASURING SYSTEM

[75] Inventors: Manfred Böhm, Stuttgart; Günter Höfgen, Kornwestheim, both of Fed. Rep. of Germany

[73] Assignee: International Standard Electric Corporation, New York, N.Y.

[21] Appl. No.: 107,001

[22] Filed: Dec. 26, 1979

Related U.S. Application Data

[63] Continuation of Ser. No. 813,923, Jul. 8, 1977, abandoned.

[51] Int. Cl.³ .............................................. G01S 1/44
[52] U.S. Cl. ........................ 343/106 R; 343/100 SA
[58] Field of Search ........ 343/112 D, 100 SA, 106 D, 343/108 M, 5 R, 7.3

[56] References Cited

U.S. PATENT DOCUMENTS

| | | | |
|---|---|---|---|
| 3,066,291 | 11/1962 | Alford | 343/106 R |
| 3,500,412 | 3/1970 | Trigon | 343/100 SA |
| 3,611,401 | 9/1968 | Connolly | 343/100 SA |
| 3,787,859 | 1/1974 | Howard | 343/106 R |

OTHER PUBLICATIONS

Annex 10 to the Convention on International Civil Aviation, vol. 1, 3rd edition, Jul. 1972, pp. 28–37.
Kayton et al., Avionics Navigation Systems, J. Wiley & Sons, 1969, p. 186.

Primary Examiner—Theodore M. Blum
Attorney, Agent, or Firm—John T. O'Halloran; Peter C. Van Der Sluys

[57] ABSTRACT

This relates to a reference station for distance-measuring systems wherein the distance between aircraft and the reference station can be measured. The station comprises an antenna and at least one receiver and/or transmitter. The antenna consists of a plurality of spatially distributed elements.

14 Claims, 9 Drawing Figures

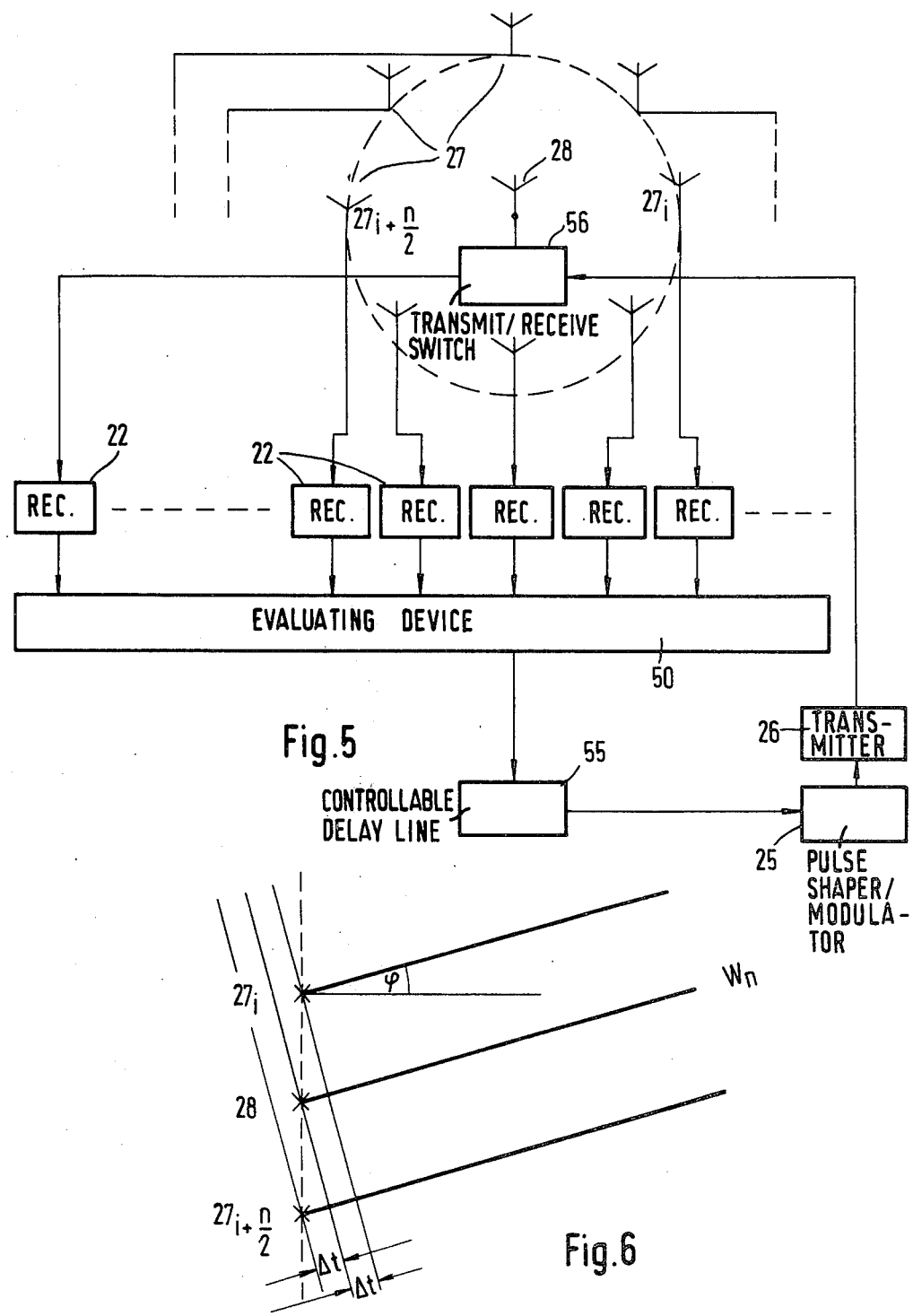

REFERENCE STATION FOR A DISTANCE-MEASURING SYSTEM

This is a continuation of application Ser. No. 813,923, filed July 8, 1977, now abandoned.

BACKGROUND OF THE INVENTION

The present invention relates to a reference station for a distance-measuring system.

Distance-measuring systems are described in a book by E. Kramar, "Funksysteme fur Ortung und Navigation", Verlag Berliner Union GmbH, Stuttgart, 1973, on pages 147 to 159.

The accuracy of the measurements is determined essentially by equipment errors and by errors caused by interfering reflections (multipath propagation).

To reduce errors caused by multipath propagation, it has proved advantageous in a two-path distance-measuring system, where pairs of pulses are radiated and received, to perform the measurement at the leading edge of the first pulse of each pulse pair. The errors caused by multipath propagation may, however, still be very large if the indirect paths are shorter than about 1,000 ml.

SUMMARY OF THE INVENTION

The object of the invention is to reduce multipath errors in distance-measuring systems.

According to a broad aspect of the invention there is provided "claim 1."

A reference station for distance-measuring systems with which the distance between aircrafts and said reference station can be measured of the type which includes an antenna, a receiver, and a transmitter, comprising a plurality of spatially distributed nondirectional elements on said antenna.

The reduction of errors caused by multipath propagation leads to a considerable improvement in measurement accuracy.

The above and other objects of the present invention will be more clearly understood from the following detailed description taken in conjunction with the accompanying drawings, in which:

BRIEF DESCRIPTION OF THE ACCOMPANYING DRAWINGS

FIG. 5 shows a third embodiment of a DME system;

FIG. 6 is a diagram explaining the different times of reception at the individual antenna elements of the embodiment of FIG. 5.

DESCRIPTION OF THE PREFERRED EMBODIMENT

Figure 1:
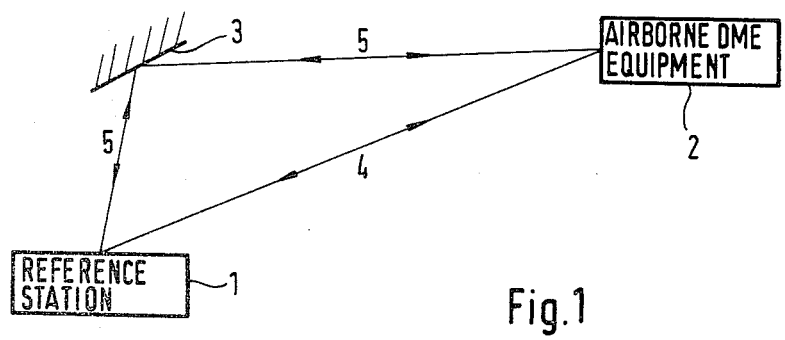
FIG. 1 shows a sketch explaining the phenomenon of multipath propagation.
Figure 2A:
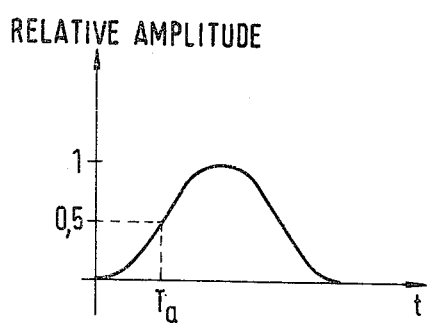
FIGS. 2a and 2b show amplitudes of desired pulses and of pulses falsified by superposition.
Figure 2B:
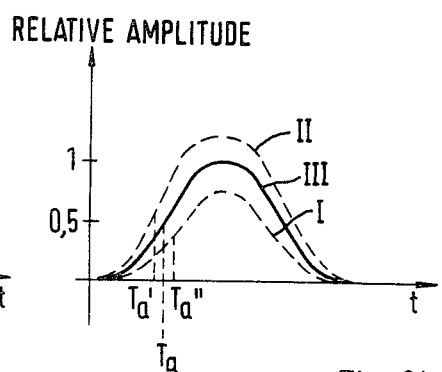

In the known distance-measuring system described in the cited reference, an airborne DME equipment 2 transmits an interrogation signal to a reference station 1. The interrogation signal consists of a pulse pair the first pulse of which is used for the distance measurement. 50 $\mu$s after the reception of the interrogation signal, the reference station 1 transmits a reply signal consisting of a pulse pair, too. The time of arrival $T_a$ of the interrogation signal at the reference station is the time at which the first pulse of the pulse pair reaches half of its amplitude (FIG. 2a). If the reference station 1 receives only the signal coming from the airborne equipment 2 by the direct path 4, an exact determination of the time of arrival $T_a$ of the interrogation signal will be possible. However, DME equipment is designed for omnidirectional use and as a result, in addition to the direct signal, signals are received which were reflected from an obstacle 3 (e.g. a mountain, house, etc.) and thus have travelled to the reference station 1 by an indirect path 5, as shown in FIG. 1, direct and indirect signals will be superimposed in the reference station. The shape and amplitude of the superimposed signal (FIG. 2b, I, II; only one pulse of the pulse pair is shown) are dependent on, among other things, the reflection coefficient of the obstacle 3, the pathlength difference, and the rf phase relationship between direct and indirect signal.

As mentioned above, the time of arrival $T_a$ is the time the first pulse reaches half of its amplitude. For the superimposed signals, these times $T_a'$, $T_a''$ lie before or after the time of arrival $T_a$ of the desired signal. Since, in the DME system, the distance is determined from the time delay of the interrogation signals from the airborne equipment to the reference station, and of the reply signals from the reference station to the airborne equipment, false delay measurements cause distance-measuring errors.

It will now be described with the aid of embodiments how errors caused by multipath propagation are considerably reduced by means of spatially distributed nondirectional antenna elements.

Figure 3:
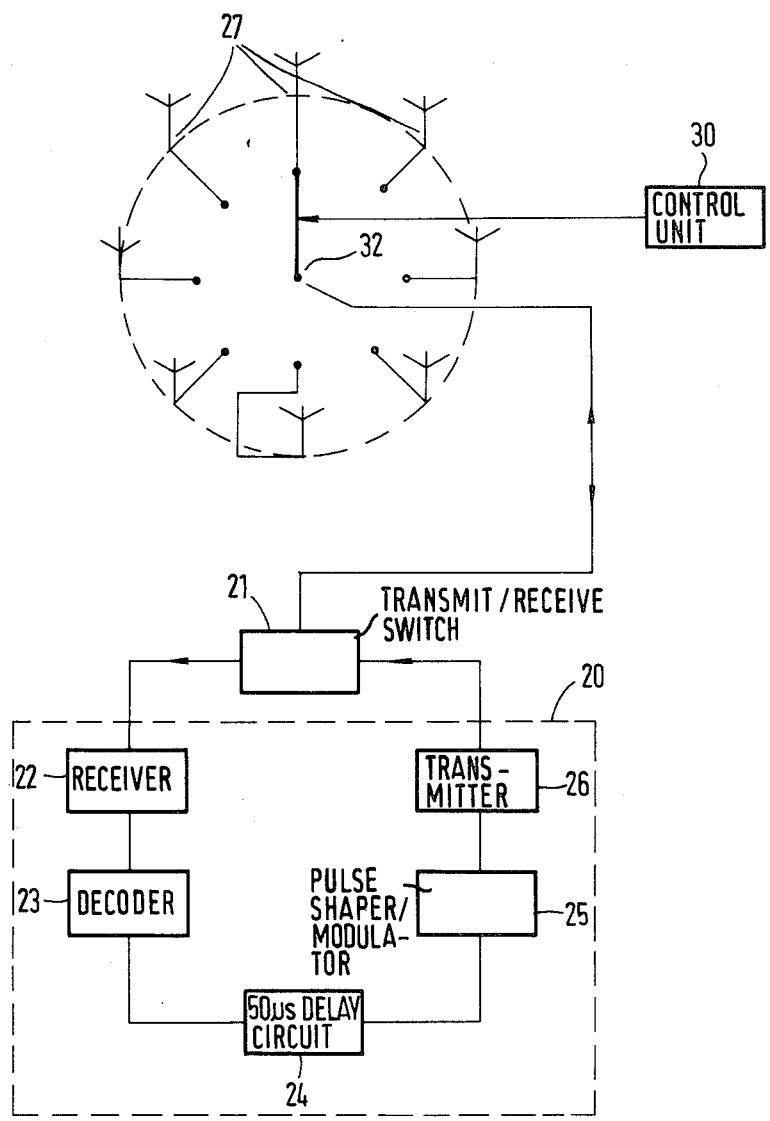
FIG. 3 shows a first embodiment of a DME system.

In FIG. 3, nondirectional or omnidirectional antenna elements 27 are connected to a transmit-receive switch 21 by means of a switch 32 controlled by a control unit 30. A transponder 20 connected to the transmit-receive switch contains a receiver 22, a decoder 23, a delay circuit 24, a pulse shaper and modulator 25, and a transmitter 26. The transponder 20 is known, for example, from the above cited reference and will not, therefore, be explained here.

The antenna elements 27 are equally spaced on a circle with a diameter of 10–15$\lambda$ ($\lambda$ is the wavelength of the radiated signal). The switch 32 connects the individual elements to the transponder 20. It may be controlled so as to connect adjacent elements or arbitrary elements in succession. Depending on the control of the switch 32, the reply signal may be transmitted via the element having received the associated interrogation signal or via any other element.

Since the antenna elements receiving the interrogation signals are each located at a different place, the paths and the rf phases of the direct and reflected interrogation signals are different at each element. The superposition of these signals thus results in different signals, i.e., the time the first resulting pulse of the interrogation signal reaches half of its maximum value lies before or after the time of arrival of the desired pulse. As a result, the distances measured aboard the aircraft are too short or too long compared to the real distance. However, since the average of the individual measurements is formed aboard the aircraft, the errors cancel out. If the interrogation signals are received or transmitted by a single fixed element only, all measurements will have the same error. Averaging, apart from that taking place as a result of the aircraft movement, will not lead to a reduction of the errors caused by multipath propagation.

Figure 4:
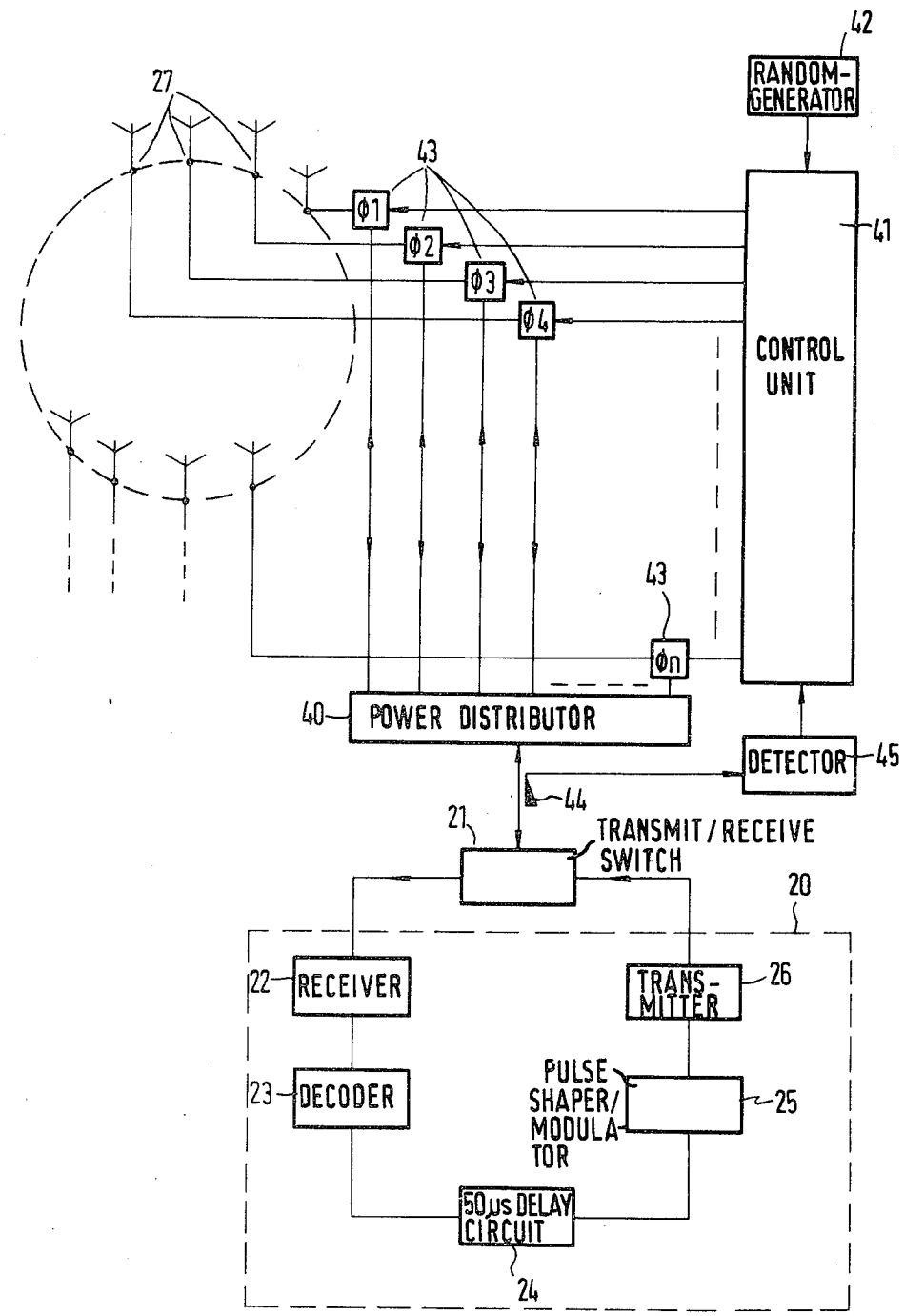
FIG. 4 shows a second embodiment of a DME system.

While in the embodiment of FIG. 3 the elements 27 are connected to the transponder 20 one after another, in the embodiment of FIG. 4 all elements are connected to the transponder 20 simultaneously. Each element is connected to the transmit-receive switch 21 of the transponder 20 via a controllable phase shifter 43 and via a power distributor 40 common to all elements. The phase shifters 43 are controlled by a control unit 41.

In the control unit 41, several switch positions (I, II, . . .) are possible. Each switch position sets in the phase shifters 43 a different set of phase shifts. The switch positions are selected by a generator 42 which may be a random generator, for example. The time of stepping from one switch position to the next is dependent on the radiation of the reply pulses. A directional coupler 44 abstracts part of the transmitter output signal and applies it to a detector 45. The output signal of the detector 45 controls the stepping of the control unit 41. Particularly advantageously, the stepping takes place during the transmitter dead times.

The phase shift of each phase shifter $\phi_2$ to $\phi_n$ is a multiple of the phase shift caused by the first phase shifter $\phi_1$, with the phase shift of the last phase shifter $\phi_n$ being 360° or a multiple of 360°. In the following table, different phase shifts are compiled:

| Phase shifts of the phase shifters (43) | | | | |
| --- | --- | --- | --- | --- |
| Switch position of control unit (41) | $\phi_1$ | $\phi_2$ | $\phi_3$ | ... $\phi_n$ |
| I | 13.3° | 26.7° | 40° | 360° |
| II | 26.7° | 53.3° | 80° | 720° |
| . | | | | |
| . | | | | |
| . | | | | |
| IX | 120° | 240° | 360° | 3,240° |

Instead of the above phase shifts, other, arbitrary phase shifts may be chosen for the individual phase shifters.

The phases of the interrogation signals received by the individual elements 27 are shifted in the phase shifters 43 by the respective value set therein. This applies both to the interrogation signal arriving by the direct path and to the signals reflected from a reflecting object. The signals shifted in phase ("direct" and "indirect" signals) are then superimposed in the power distributor 40. The shape and the amplitude of the output signal of the power distributor 40 are dependent on, among other things, the rf phase of the individual signals.

If the rf phase of the successively arriving interrogation signals is shifted by different values, the shape and amplitude of the output signal of the power distributor 40 will change as well. This results in the determined time of arrival of the first pulse of the interrogation signal being different from interrogation signal to interrogation signal and lying in part before or after the time of arrival of the desired, unreflected interrogation signal.

As a result, partly too long and partly too short distances are measured aboard the aircraft, as in the embodiment of FIG. 3. By the averaging performed aboard the aircraft, the errors caused by multipath propagation are largely eliminated.

In the embodiment of FIG. 5, as in the embodiment of FIG. 4, all antenna elements are connected at the same time. However, while in the embodiment of FIG. 4 all elements are connected to one receiver 22, each element 27 is now allotted a receiver 22 of its own. In addition, an additional element 28 is provided at the center of the circle. This element 28 is connected to a receiver 22 and a transmitter 26 via a transmit-receive switch 56. The transmitter 26 is controlled by a pulse shaper and modulator 25, as in the other embodiments. The receiver 22, the transmitter 26, and the pulse shaper and modulator 25 perform the same functions as in the embodiments of FIGS. 3 and 4 and will not, therefore, be explained here.

The output signals of the receivers 22 are fed to an evaluating device 50 which determines the difference $t_s$ between the times of arrival of the reflected and unreflected signals. The calculation of this time difference will be explained below. Since this time difference $t_s$ occurs both on the path from the airborne DME to the reference station and on the path from the reference station to the airborne DME, it must be taken into account twice. This is done in the controllable delay line 55. In known DME reference stations, the delay between the reception of the interrogation signal and the transmission of the reply signal is 50 μs. This delay is obtained by means of delay circuits, e.g. 24 in FIGS. 3 and 4. Instead of having this fixed 50-μs delay, the delay is now chosen so that the error caused by the time difference $t_s$ is eliminated. If the time difference is plus 3.5 μs, for example, i.e., due to reflections on the path between the airborne DME and the reference station, the signal travels 3.5 μs longer than by the direct path, the delay will be only 50 μs − 2 × 3.5 μs = 43 μs instead of 50 μs. The reply signal is radiated by the central element 28.

Next, the calculation of the time difference $t_s$ will be explained. From German Offenlegungsschrift (DT-OS) No. 2,358,585 it is known how errors caused by reflections are eliminated in angle measurements. Time errors in distance measurements are eliminated using similar methods.

In FIG. 6 an incident plane wave $W_n$ (interrogation signal) falls on three antenna elements $27_i$, $27_{i+(n/2)}$, 28 arranged equidistantly along a straight line. n is the total number of elements 27 arranged on the circle. 28 is the central element. If the elements are not equally spaced, the different distances must be taken into account during evaluation.

The direct-path plane wave $W_n$ (interrogation signal from the airborne DME) arrives at the three elements with a time difference $\Delta t$. The amplitudes of the interrogation signal at the three elements are equal to one another.

If a reflected signal is superimposed on the direct-path interrogation signal, the amplitudes of the signal received by the individual elements will no longer be equal to one another, for the reflected signal will be vectorially superimposed on the directpath signal. As a result, different times of reception will be measured, because the time the interrogation pulse reaches half of its maximum value is defined as the time of reception. The superposition of the signals is shown in the phasor diagram of FIG. 7.

The amplitudes, $n_i$, $n_{28}$, and $n_{i+(n/2)}$ are the amplitudes of the direct-path signal. They are equal to one another at the three individual elements. The times the direct-path signal reaches half of its amplitude at the individual elements are $\Delta t$ apart.

$S_i$, $S_{28}$, and $S_{i+(n/2)}$ are the amplitudes of the reflected signal. They are equal to one another at the three individual elements. The times the reflected signal reaches half of its amplitude at the individual elements are $\Delta s$ apart.

$m_i$, $m_{28}$, and $m_{i+(n/2)}$ are the amplitudes of the actually received signal, which is formed by vectorial superposition of direct-path and reflected signals. The resulting signal arrives at the element 28 by $\Delta t_i$ later than at the element 27$_i$, and at the element 27$_{i+(n/2)}$ by $\Delta t_{i+(n/2)}$ later than at the element 28. The time differences $\Delta t_i$ and $\Delta t_{i+n/2}$ are measured in the evaluating device 50. With the aid of the phasor diagram of FIG. 8 it will now be described how the difference $t_s$ between the time of arrival of the (actually nonexisting) direct-path signal at the element 28 and that of the resulting (actually received) signal is determined.

Figure 7:
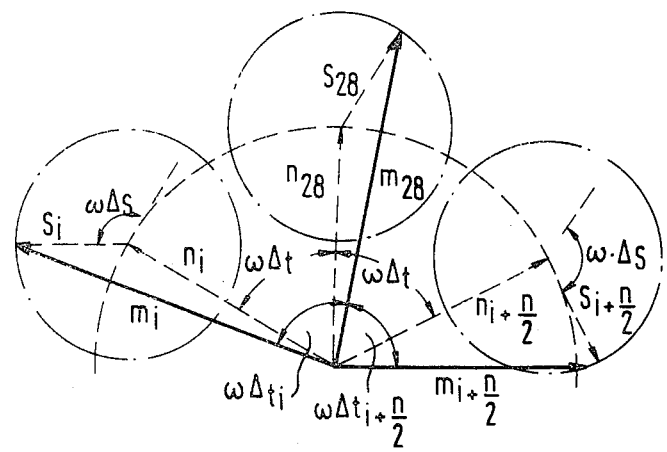
FIGS. 7 and 8 are phasor diagrams with the aid of which the calculation of a time error will be described.
Figure 8:
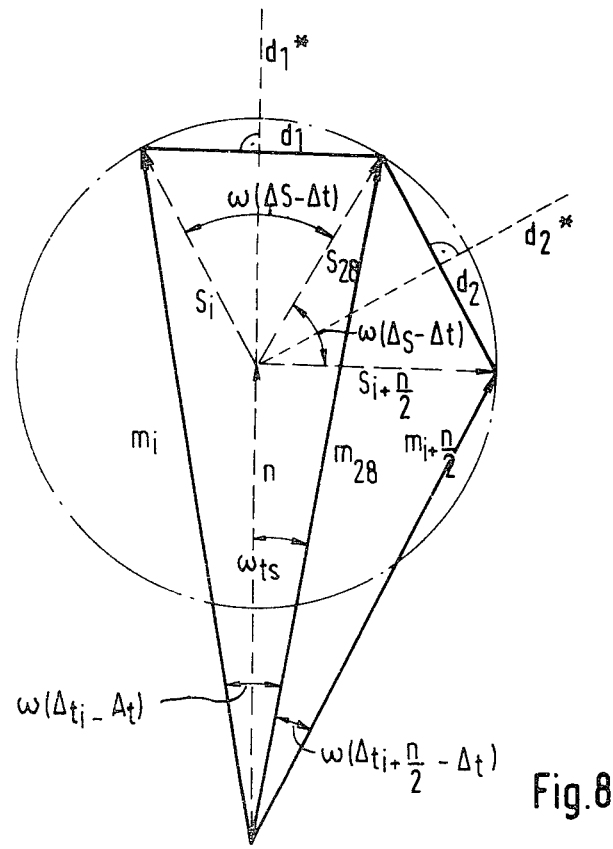

The lengths and positions of the phasors of FIG. 8 were changed from those of the phasors of FIG. 7 for the sake of clarity.

Compared to the representation of FIG. 7, the phasors $n_i$ and $n_{i+(n/2)}$ have been turned through the angle $\omega \Delta t$ so as to coincide with the phasor $n_{28}$. The angle between the reflected-signal phasors $S_{28}$ and $S_i$ is the same as that between the reflected-signal phasors $S_{28}$ and $S_{i+(n/2)}$, namely $\omega(\Delta S - \Delta t)$; the angle between the measured phasors $m_{28}$ and $m_i$ is $\omega(\Delta t_i - \Delta t)$, and that between the measured phasors $m_{28}$ and $m_{i+(n/2)}$ is $\omega(\Delta t_{i+(n/2)}\Delta t)$. The distances designated $d_1$ and $d_2$ are equally long. Using the cosine law for $d_1$ and $d_2$ yields, since $d_1$ and $D_2$ are equally long, $$m_{28}^2 + m_i^2 - 2m_{28}m_i \cos \omega(\Delta t_i - \Delta t)$$
$$= m_{28}^2 + m_1^2 + \frac{n}{2} - 2m_{28}m_i + \frac{n}{2} \cos \omega(\Delta t_i + \frac{n}{2} - \Delta t),$$

where $\omega$ is the angular frequency of the signal. From this equation, $\Delta t$ can be calculated.

However, since it is the time interval $t_s$ which is to be found, i.e., the time between the arrival at the element 28 of the resulting signal and of the direct-path signal, the time of arrival for the direct-path phasor n, i.e. for the direct-path signal, must be determined.

As can be seen from the phasor diagram, the point where the two perpendicular bisectors $d_1{}^*$ and $d_2{}^*$ of the connection lines $d_1$ and $d_2$ intersect gives the head of the phasor n of the direct-path signal. The angle between the phasors n and $m_{28}$ corresponds to the time error $t_s$.

In the embodiment it was assumed that the antenna array consists of several nondirectional elements arranged on a circle and of a central element. It also follows from the description that at least three elements arranged along a straight line are necessary to determine the time error. Since in the embodiment of FIG. 5 each element is connected to one receiver, it is impossible to simultaneously calculate the time error with several elements and average the result.

Besides the three-element array described, other arrangements are possible, too, e.g. two pairs of antennas, in which case the connecting lines between these pairs must be parallel.

We claim:

1. A reference station for distance-measuring systems of the type that includes an antenna for receiving an interrogation signal from an aircraft, a receiver for said signal and a transmitter for providing a reply signal through said antenna so that the distance between aircrafts and said reference station can be measured, comprising:
 a plurality of spatially distributed nondirectional elements on said antenna, each of said elements being adapted for connection to one of said receiver and transmitter.

2. A reference station according to claim 1 further comprising:
 a power distributor; and
 a plurality of controllable phase shifters each coupled to one of said spatially distributed elements, said elements being adapted for simultaneous connection to one of said receiver and transmitter.

3. A reference station according to claim 2 wherein said plurality of controllable phase shifters comprise n phase shifters and further including a control unit for controlling the phase shift in each of said phase shifters such that the $i^{th}$ phase shifter causes i times the phase shift of the first phase shifter, and wherein the phase shift of the $n^{th}$ phase shifter is N times 360° where N is an integer.

4. A reference station according to claim 3 further including a random generator for controlling said control unit.

5. A reference station according to claim 4 wherein said phase shifters are switched synchronously with the transmission of a transmitter signal.

6. A reference station according to claim 1 wherein said plurality of said spatially distributed elements are arranged in a circle.

7. A reference station according to claim 1 further including
 a switch; and
 a control unit for controlling said switch such that only one element is coupled to said receiver and transmitter at a time.

8. A reference station according to claim 7 wherein said plurality of spatially distributed elements are arranged on a circle.

9. A reference station according to claim 1 wherein each of said plurality of said spatially distributed elements is connected to a receiver and one of said elements is connected to a transmitter further including an evaluating device for determining from measured amplitudes ($n_i$, $m_{28}$, $m_{i+(n/2)}$) of the received signal and from the time differences ($\Delta t_i - \Delta t$; $\Delta t_{i+(n/2)} - \Delta t$) between the times of arrival of the signal at the spatially distributed elements taking into account the geometric arrangement of the elements, whether thee is a time error ($t_s$) determined by the difference between the measured time of arrival of the received signal and the calculated time of arrival of the direct path signal, and that the time error ($t_s$) is considered twice when fixing the time of transmission of the reply signal.

10. A reference station according to claim 9 wherein at least three elements are arranged along a straight line.

11. A reference station according to claim 10 wherein said elements are equally spaced.

12. A reference station according to claim 11 wherein a plurality of three element groups are arranged in a rotationally symmetrical configuration.

13. A reference station according to claim 9 further comprising at least two pairs of elements, with the connecting lines between the elements of one pair being parallel to that between elements of the other pair.

14. A reference station according to claim 1, wherein said antenna comprises at least three spatially distributed non-directional elements.

* * * * *